United States Patent
Erta et al.

(10) Patent No.: US 12,143,880 B2
(45) Date of Patent: Nov. 12, 2024

(54) THROUGHPUT AND WIRELESS CHANNEL INTERFERENCE MITIGATION FOR MOBILE SYSTEMS

(71) Applicant: Cisco Technology, Inc., San Jose, CA (US)

(72) Inventors: Alessandro Erta, Licciana Nardi (IT); Luca Bisti, Grosseto (IT); Domenico Ficara, Essertines-sur-Yverdon (CH); Kasi Nalamalapu, Cupertino, CA (US); Salvatore Valenza, Pomy (CH); Vincent Cuissard, Eteaux (FR); Sudhir Kumar Jain, Fremont, CA (US); Loris Gazzarrini, Lausanne (CH); Arun Khanna, Sunnyvale, CA (US); Stefano Ferrari, Le mont sur Lausanne (CH); Pascal Thubert, Roquefort les Pins (FR)

(73) Assignee: Cisco Technology, Inc., San Jose, CA (US)

( * ) Notice: Subject to any disclaimer, the term of this patent is extended or adjusted under 35 U.S.C. 154(b) by 316 days.

(21) Appl. No.: 17/483,314

(22) Filed: Sep. 23, 2021

(65) Prior Publication Data
US 2023/0092337 A1 Mar. 23, 2023

(51) Int. Cl.
*H04W 36/00* (2009.01)
*H04W 24/08* (2009.01)
(Continued)

(52) U.S. Cl.
CPC .......... *H04W 36/08* (2013.01); *H04W 24/08* (2013.01); *H04W 36/0016* (2013.01); *H04W 36/20* (2013.01)

(58) Field of Classification Search
None
See application file for complete search history.

(56) References Cited

U.S. PATENT DOCUMENTS

| 8,903,379 B2 | 12/2014 | Ceccherini et al. |
| 9,351,224 B2 | 5/2016 | Zhou et al. |

(Continued)

FOREIGN PATENT DOCUMENTS

WO 2020187430 9/2020

OTHER PUBLICATIONS

"Cisco Catalyst 9800 Series Wireless Controller Software Configuration Guide, Cisco IOS XE Gibraltar 16.12.x", Radio Resource Management, Aug. 10, 2021, 23 pages, Cisco.com.

(Continued)

*Primary Examiner* — Abdelillah Elmejjarmi
(74) *Attorney, Agent, or Firm* — BEHMKE INNOVATION GROUP LLC; James M. Behmke; Keith O. Mitchell

(57) ABSTRACT

In one embodiment, a mobile system scans wireless channels for any upcoming access points using a dedicated monitor radio of the mobile system. The mobile system identifies a particular wireless channel in use by an upcoming access point. The mobile system notifies a second radio of the mobile system of the particular wireless channel. The mobile system performs a handoff between a current access point and the upcoming access point in part by switching the second radio of the mobile system to the particular wireless channel of the upcoming access point.

20 Claims, 7 Drawing Sheets

(51) Int. Cl.
    *H04W 36/08*    (2009.01)
    *H04W 36/20*    (2009.01)

(56) References Cited

U.S. PATENT DOCUMENTS

| | | | |
|---|---|---|---|
| 9,877,251 | B2 | 1/2018 | Stager et al. |
| 10,681,606 | B2 | 6/2020 | Zhou |
| 2010/0135252 | A1* | 6/2010 | Forte ................ H04W 36/0016 370/331 |
| 2014/0287751 | A1* | 9/2014 | Lee ..................... H04W 48/16 455/434 |
| 2015/0264614 | A1* | 9/2015 | Stager ............... H04W 36/0061 370/332 |
| 2016/0373984 | A1* | 12/2016 | Hara ................ H04W 36/0085 |

OTHER PUBLICATIONS

Miu, et al. "Multi-Radio Diversity in Wireless Networks", Wireless Networks, vol. 13, Issue 6, Dec. 2007, pp. 779-798, Springer.

* cited by examiner

THROUGHPUT AND WIRELESS CHANNEL INTERFERENCE MITIGATION FOR MOBILE SYSTEMS

TECHNICAL FIELD

The present disclosure relates generally to computer networks, and, more particularly, to throughput and wireless channel interference mitigation for mobile systems.

BACKGROUND

Cellular network coverage has made Internet connectivity increasingly ubiquitous. This has led to an ever-increasing demand for bandwidth, to accommodate traffic such as multimedia content and communications (e.g., bandwidth-intensive high definition video streaming or real time video calls, etc.). For instance, passengers of public transportation now expect on-board, high-speed connectivity, which implies a reliable wireless ground-to-vehicle communication.

To ensure seamless handoffs between access points, many wireless networks used for high-speed connectivity utilize a single wireless channel across access points. However, using a single wireless channel also increases the chances of adjacent access points interfering with one another, which can lower the overall performance of the wireless network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
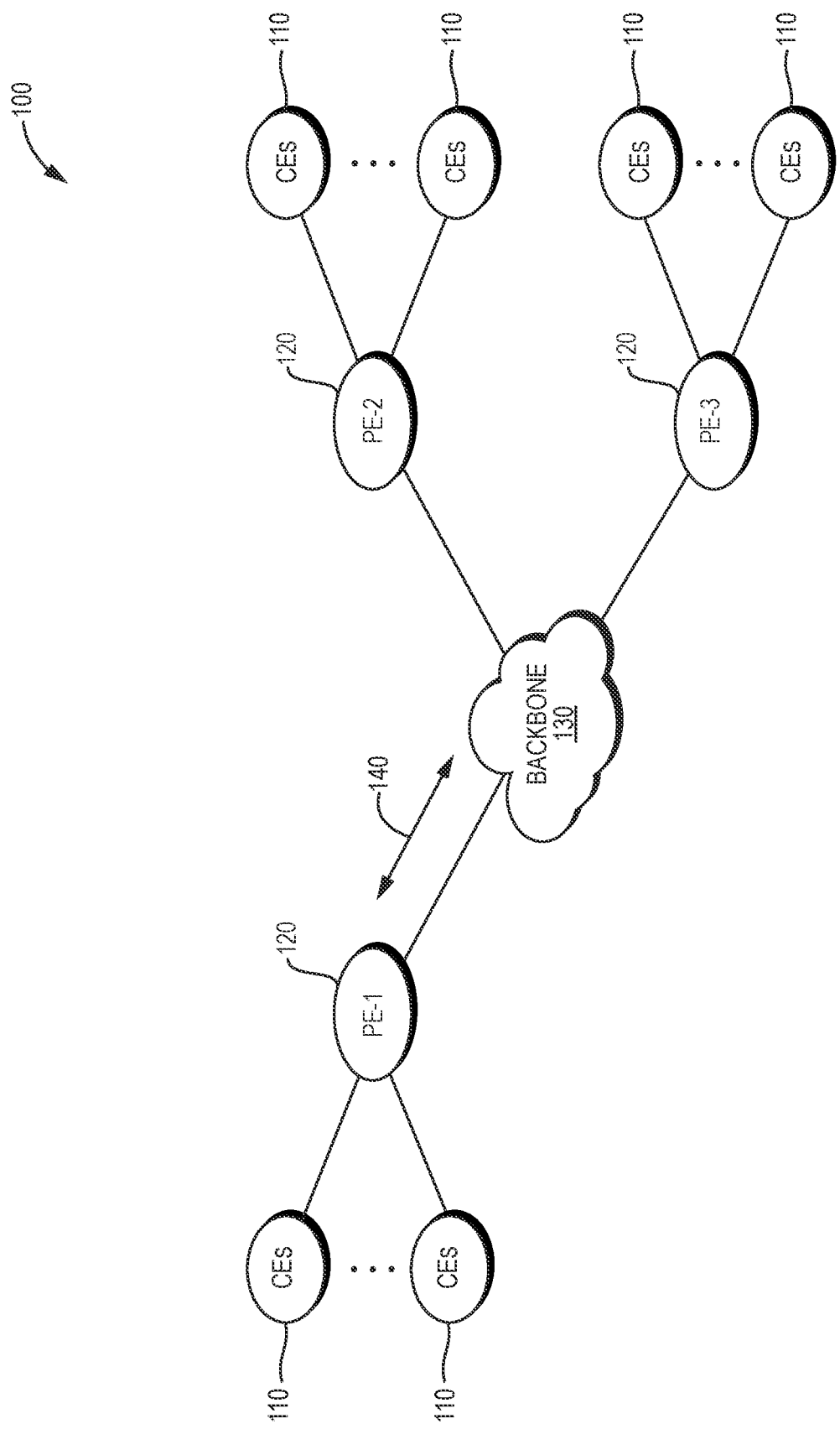
FIGS. 1A-1B illustrate an example communication network.

According to one or more embodiments of the disclosure, a mobile system scans wireless channels for any upcoming access points using a dedicated monitor radio of the mobile system. The mobile system identifies a particular wireless channel in use by an upcoming access point. The mobile system notifies a second radio of the mobile system of the particular wireless channel. The mobile system performs a handoff between a current access point and the upcoming access point in part by switching the second radio of the mobile system to the particular wireless channel of the upcoming access point.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.
2.) Site Type B: a site connected to the network by the CE router via two primary links (e.g., from different Service Providers), with potentially a backup link (e.g., a 3G/4G/5G/LTE connection). A site of type B may itself be of different types:
2a.) Site Type B1: a site connected to the network using two MPLS VPN links (e.g., from different Service Providers), with potentially a backup link (e.g., a 3G/4G/5G/LTE connection).
2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.
2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
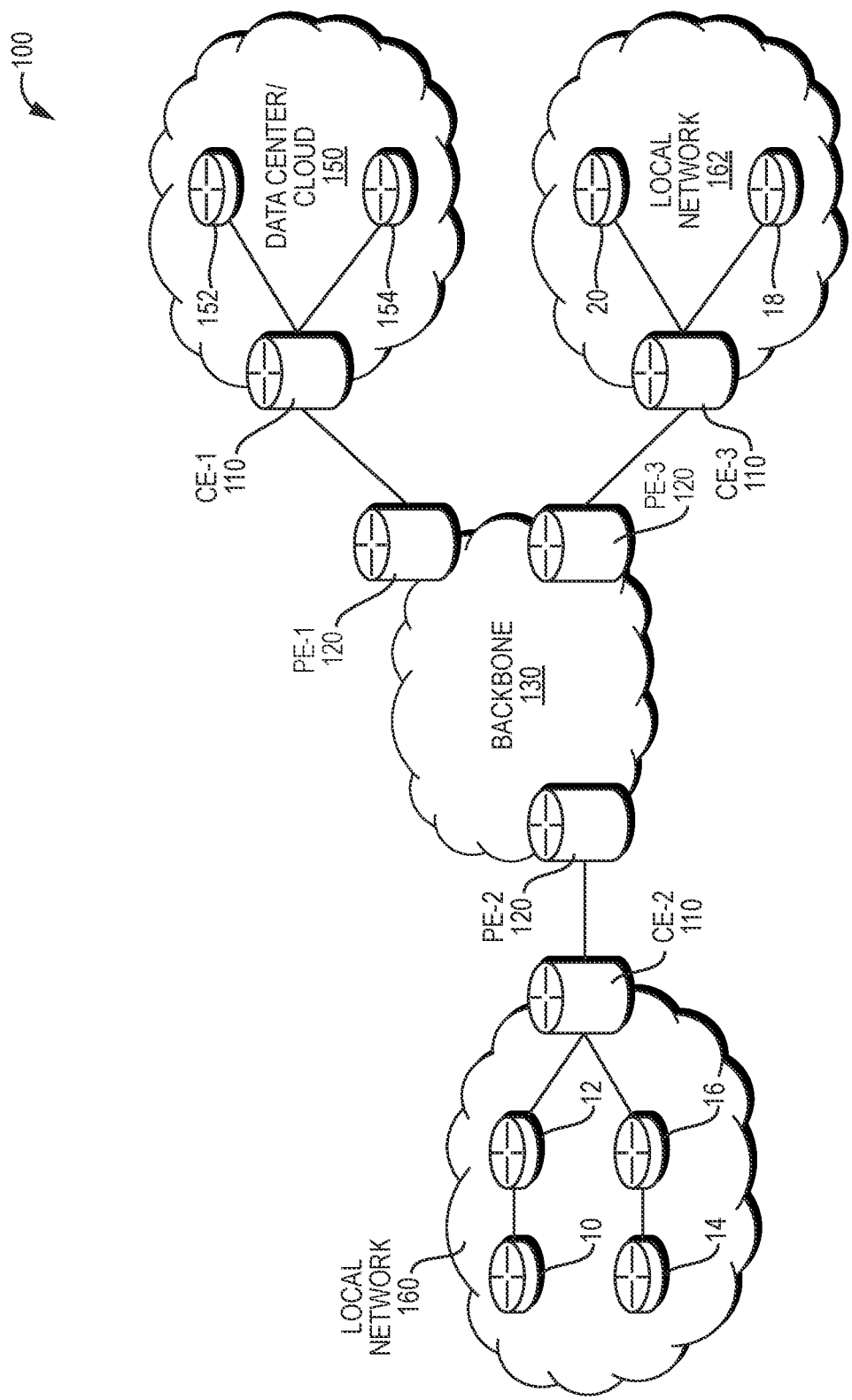

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
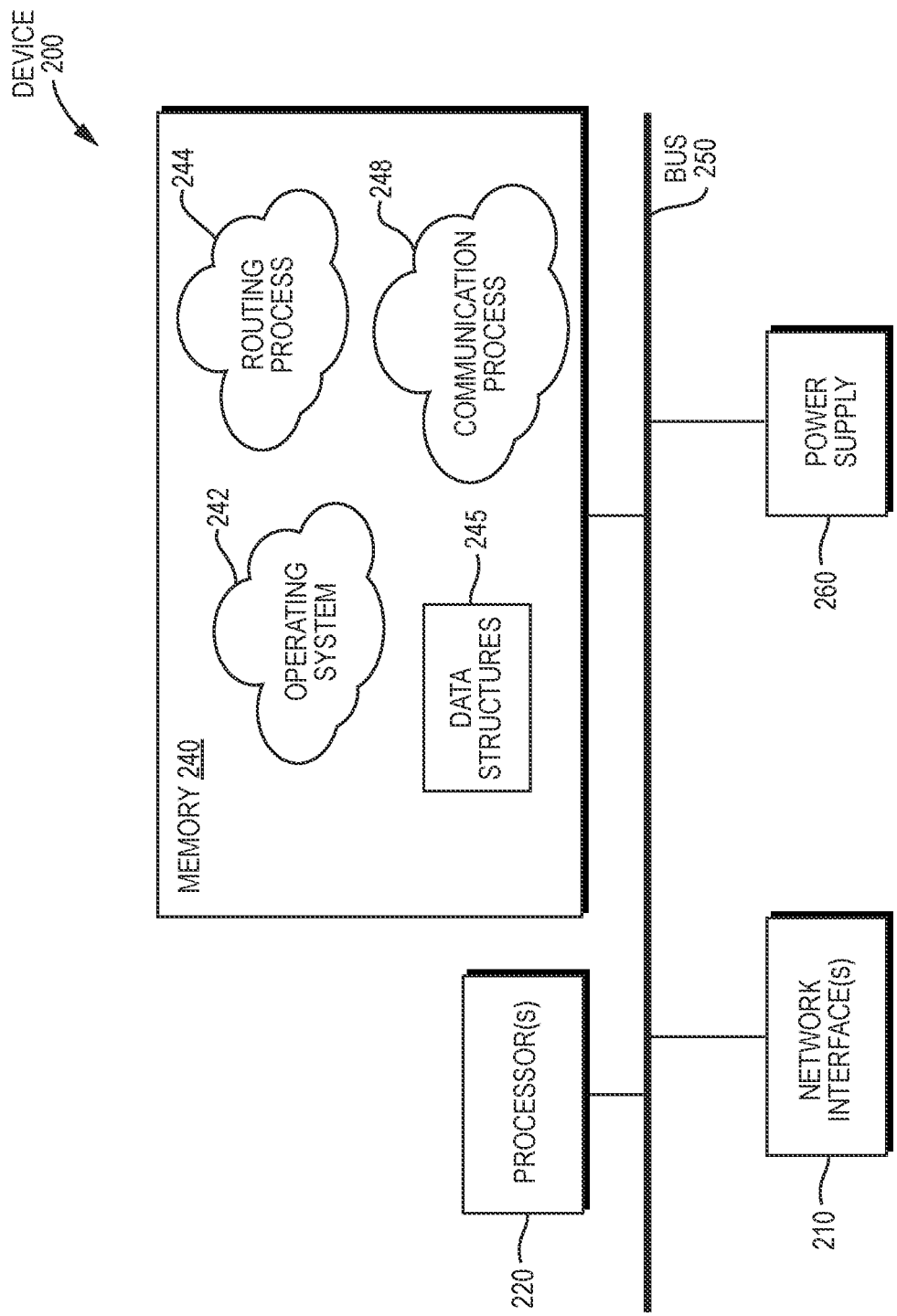
FIG. 2 illustrates an example network device/node.

FIG. 2 is a schematic block diagram of an example node/device 200 that may be used with one or more embodiments described herein. As shown, device 200 may comprise one or more communication interfaces 210 (e.g., wired, wireless, etc.), at least one processor 220, and a memory 240 interconnected by a system bus 250, as well as a power supply 260 (e.g., battery, plug-in, etc.).

Communication interface(s) 210 include the mechanical, electrical, and signaling circuitry for communicating data over a communication link. To this end, communication interface(s) 210 may be configured to transmit and/or receive data using a variety of different communication protocols, such as TCP/IP, UDP, Ethernet, etc. Note that the device 200 may have multiple different types of communication interface(s) 210, e.g., wireless and wired/physical connections, and that the view herein is merely for illustration.

The memory 240 comprises a plurality of storage locations that are addressable by the processor(s) 220 and the communication interface(s) 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor(s), functionally organizes the node by, inter alia, invoking network operations in support of software processors and/or services executing on the device. These software processors and/or services may comprise a routing process 244 and/or a communication process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process 244 includes instructions executable by processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), 6LoWPAN Ad Hoc On-Demand Distance Vector Routing (LOAD), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In general, communication process 248 includes instructions executable by processor 220 to perform functions related to a mobile system roaming from one wireless access point to another. To this end, communication process 248 may operate in conjunction with routing process 244, in some instances, to establish and maintain one or more LSPs between a mobile system and the backend infrastructure. An example protocol that uses label-switched paths is the Multiprotocol Label Switching (MPLS) protocol. In general, MPLS operates by appending an MPLS header to a packet that includes a label 'stack.' The label(s) in the stack are inserted by a label edge router (LER) based on the forwarding equivalence class (FEC) of the packet. Paths are also managed via the Label Distribution Protocol (LDP) or Resource Reservation Protocol-Traffic Engineering (RSVP-TE).

In various embodiments, as detailed further below, communication process 248 may also include computer executable instructions that, when executed by processor(s) 220, cause device 200 to perform the techniques described herein with respect to preventing the use of a specific base station of a wireless network. To do so, in some embodiments, communication process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, communication process 248 may employ one or more supervised, unsupervised, or semi-supervised machine learning models. Generally, supervised learning entails the use of a training set of data, as noted above, that is used to train the model to apply labels to the input data. For example, the training data may include sample location data and performance metrics that have been labeled as acceptable or not acceptable. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that communication process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

Figure 3:
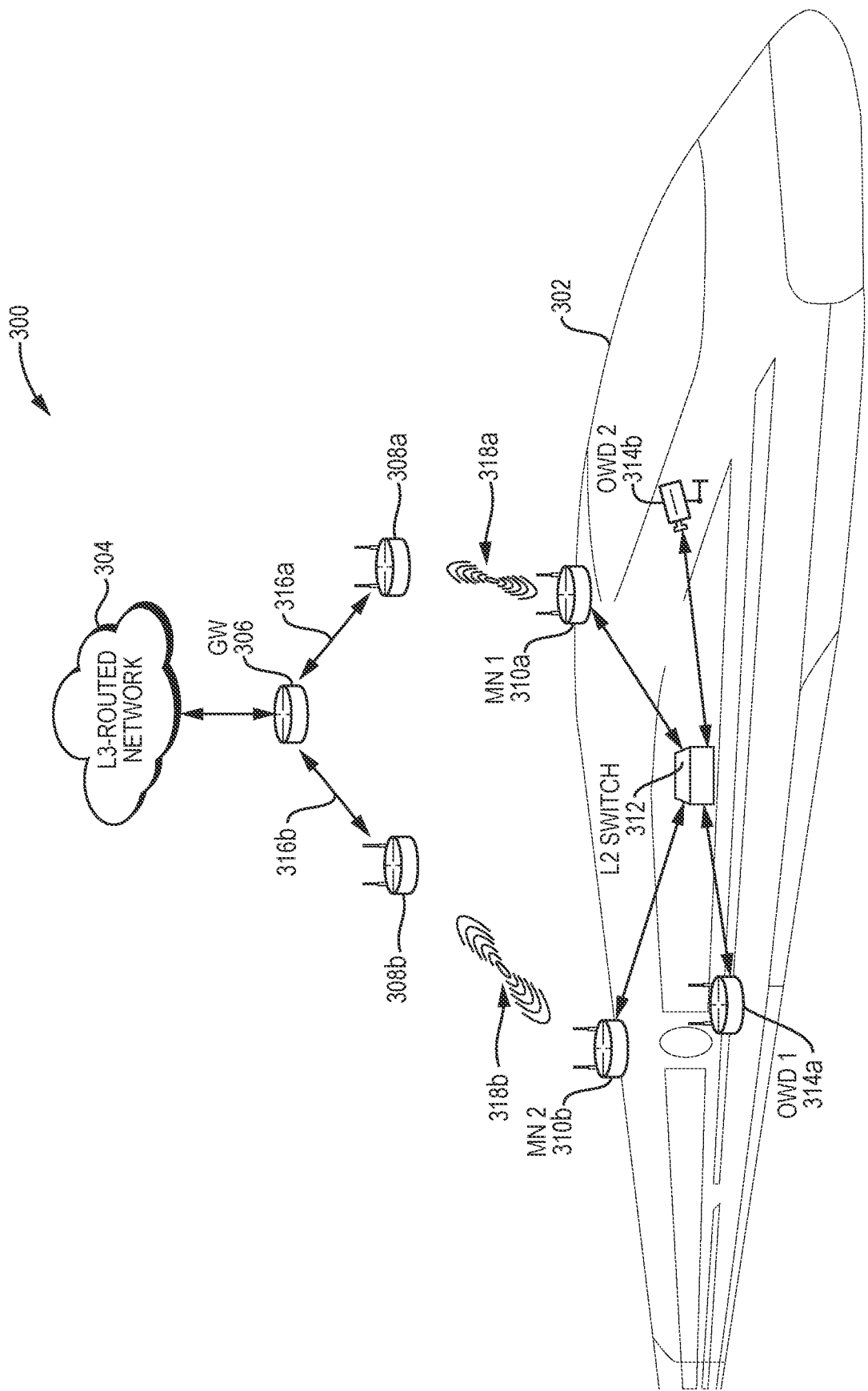
FIG. 3 illustrates an example of a mobile system communicating wirelessly.

FIG. 3 illustrates an example 300 of a mobile system communicating wirelessly, according to various embodiments. As shown, the mobile system 302 may generally take the form of any mobile object or set of objects equipped with its own internal network and configured to communicate wirelessly with a backhauling system during motion. For instance, mobile system 302 may take the form of a train, bus, airplane or other flying vehicle, ferry, automobile, mine cart, crane, truck, another form of vehicle that may be used for transportation or shipping, a vehicle that may be found in a worksite, mining location, industrial site, factory, etc., a robot, or the like. In further cases, mobile system 302 may be a fully-autonomous, or partially-autonomous, vehicle or other system that moves with little or no direct human control.

Onboard mobile system 302 may be various networking devices that support the mobile domain of mobile system 302. In some embodiments, as shown, there may be a Layer-2 (L2) switch 312 onboard mobile system 302 that is connected to any number of onboard devices 314 within the mobile domain of mobile system 302. For instance, onboard device 314a may take the form of an onboard Wi-Fi access point that provides connectivity to any number of user devices (e.g., mobile phones, computers, etc.) of passengers being transported by mobile system 302. Conversely, onboard device 314b may take the form of a security camera that is also connected to L2 switch 312. In various embodiments, some or all of the onboard devices 314 may be onboard wired devices (OWDs), meaning that they communicate with L2 switch 312 via wired connections, such as an Ethernet network or the like.

According to various embodiments, the mobile domain of mobile system 302 may also include a plurality of mobile nodes 310, denoted "MN" in the Figures for simplicity. For instance, as shown, mobile system 302 may include a first MN 310a and a second MN 310b. Each MN 310 may generally include: 1.) a wireless interface to exchange data with wireless access points of the backhaul network and 2.) a local interface to exchange data with the local network of mobile system 302. For instance, MN 310a and MN 310b may each have a wired connection to L2 switch 312.

As would be appreciated, MN 310a and MN 310b may be located on mobile system 302 at a distance from one another, so as to provide spatial diversity to the potential wireless connection points utilized by mobile system 302. For example, MN 310a may be located near the front of mobile system 302 (e.g., the head-end of a train), while MN 310b may be located farther towards the rear of mobile system 302 than that of MN 310a. Thus, even if a particular MN 310 does not have a reliable wireless connection to the backhaul system, another MN 310 of mobile system 302 may (e.g., if the train is going around a curve in the track, etc.). In some instances, MNs 310 may also offer frequency diversity, as well, such as by operating on different frequencies, at least part of the time. As a result, even if one frequency is experiencing interference, the other frequency could be used to form a wireless connection between mobile system 302 and the backhaul system.

Located along the path of travel of mobile system 302 (e.g., a railroad track, a road, a waterway, a runway, etc.) may be any number of wireless access points/base stations 308. For instance, as shown, there may be trackside access points (APs)/base stations 308a-308b shown. Note that while these wireless access points are referred to herein as 'trackside,' their locations can be varied depending on the deployment scenario (e.g., roadside, etc.).

During operation, base stations 308a-308b may form wireless connections with MN 310a and/or MN 310b, to provide wireless connectivity to mobile system 302 as it travels. To this end, each base station 308 may include at least 1.) a wireless interface to communicate with a MN 310 and 2.) an interface to communicate with a gateway, denoted "GW" 306 in the Figures for simplicity. Typically, the connections between base stations 308a-308b and GW 306 are wired connections that use a suitable wired communication protocol, such as Ethernet.

GW 306 represents the other end of the backhauling system and provides Layer-3 (L3) routing functions. To do so, GW 306 may include at least one interface connected to L3-routed network 304, as well as any number of interfaces to communicate with base stations 308. For instance, L3-routed network 304 may take the form of the Internet, in many instances, although the techniques herein may be extended to any number of different types of external networks, as desired.

Traditionally, a backhaul system supporting mobile domains/systems relies on the use of multiple tunnels, to convey traffic between the L3 gateway and the mobile domain/system. For instance, as shown, assume that MN 310a has formed a wireless connection 318a with base station 308a. Such a connection may be formed using a suitable transmission protocol, such as the Prodigy protocol by Fluidmesh (now Cisco Systems) or another wireless protocol that supports extremely fast handoffs. Consequently, MN 310a may establish a first tunnel over wireless connection 318a. GW 306 and base station 308a may form a second tunnel via their connection 316a, likewise. Thus, when base station 308a sends traffic that it receives from MN 310a towards GW 306, it may encapsulate the traffic and tunneled via the first tunnel, which base station 308a then encapsulates for transport via the second tunnel to GW 306. A similar approach may be taken with respect to wireless connection 318b between MN 310b and base station 308b, as well as connection 316b between base station 308b and GW 306.

In alternative embodiments, a single L2 tunnel may be established between each base station 308 and GW 306. This tunnel will carry L2 traffic between GW 306 and the MN 310 to which the base station 308 is connected. For instance, a first L2 tunnel may be formed between GW 306 and base station 308a over which traffic conveyed between base station 308a and MN 310a may be transported, assuming that wireless connection 318a exists. Similarly, another GW 306 and base station 308b may form a second L2 tunnel over which traffic conveyed between base station 308b and MN 310b may be transported, assuming that wireless connection 318a exists.

Typically, only a single wireless link is active at any given time between a mobile system, such as mobile system 302, and any given base station 308. For instance, assume that MN 310a is wirelessly connected to base station 308a. In such a case, any other MN 310 on mobile system 302 (e.g., MN 310b, etc.) may be in an idle state at that time. In other words, one of the mobile nodes MN 310a) may be designated as the primary, while the other is designated as the secondary (e.g., MN 310b) and remains idle. As mobile system 302 roams, the primary node may begin passing its traffic to the secondary node, to begin leveraging its own connection to the fixed infrastructure. In turn, the roles of the two nodes may be switched, thereby making MN 310a the secondary node and MN 310b the primary node.

As noted above, a simple deployment of the wireless network shown in FIG. 3 would be to configure each base station 308 to communicate using the same wireless channel. Doing so simplifies the handoff process, as mobile system 302 only needs to communicate using that wireless channel. However, this approach can also complicate network deployment, as an access point/base station too close to another could cause interference, thereby disrupting communications between mobile system 302 and the infrastructure. Conversely, if the access points are located too far from one another, this could create a 'dead zone' whereby mobile system 302 is not able to communicate with any access point/base station at a certain location.

In a further case, the wireless network may be deployed such that alternating access points use alternating channels (i.e., two channels are used across the network). While this approach can help to alleviate some of the challenges of a single-channel approach, this still requires extensive planning and does not support adaptive radio management solutions, which can help to improve overall throughput and lower interference, —Throughput and Wireless Channel Interference Mitigation for Mobile Systems—

The techniques herein allow for throughput and wireless channel interference mitigation for mobile systems by supporting the use of different wireless channels by different access points. In some aspects, the techniques herein propose using a dedicated monitor radio on a mobile system that scans for channels used by any upcoming access points of the backhaul network.

Illustratively, the techniques described herein may be performed by hardware, software, and/or firmware, such as in accordance with the communication process 248, which may include computer executable instructions executed by the processor 220 (or independent processor of interfaces 210) to perform functions relating to the techniques described herein, potentially in conjunction with routing process 244.

Specifically, in some embodiments, a mobile system scans wireless channels for any upcoming access points using a dedicated monitor radio of the mobile system. The mobile system identifies a particular wireless channel in use by an upcoming access point. The mobile system notifies a second radio of the mobile system of the particular wireless channel. The mobile system performs a handoff between a current access point and the upcoming access point in part by switching the second radio of the mobile system to the particular wireless channel of the upcoming access point.

Figure 4:
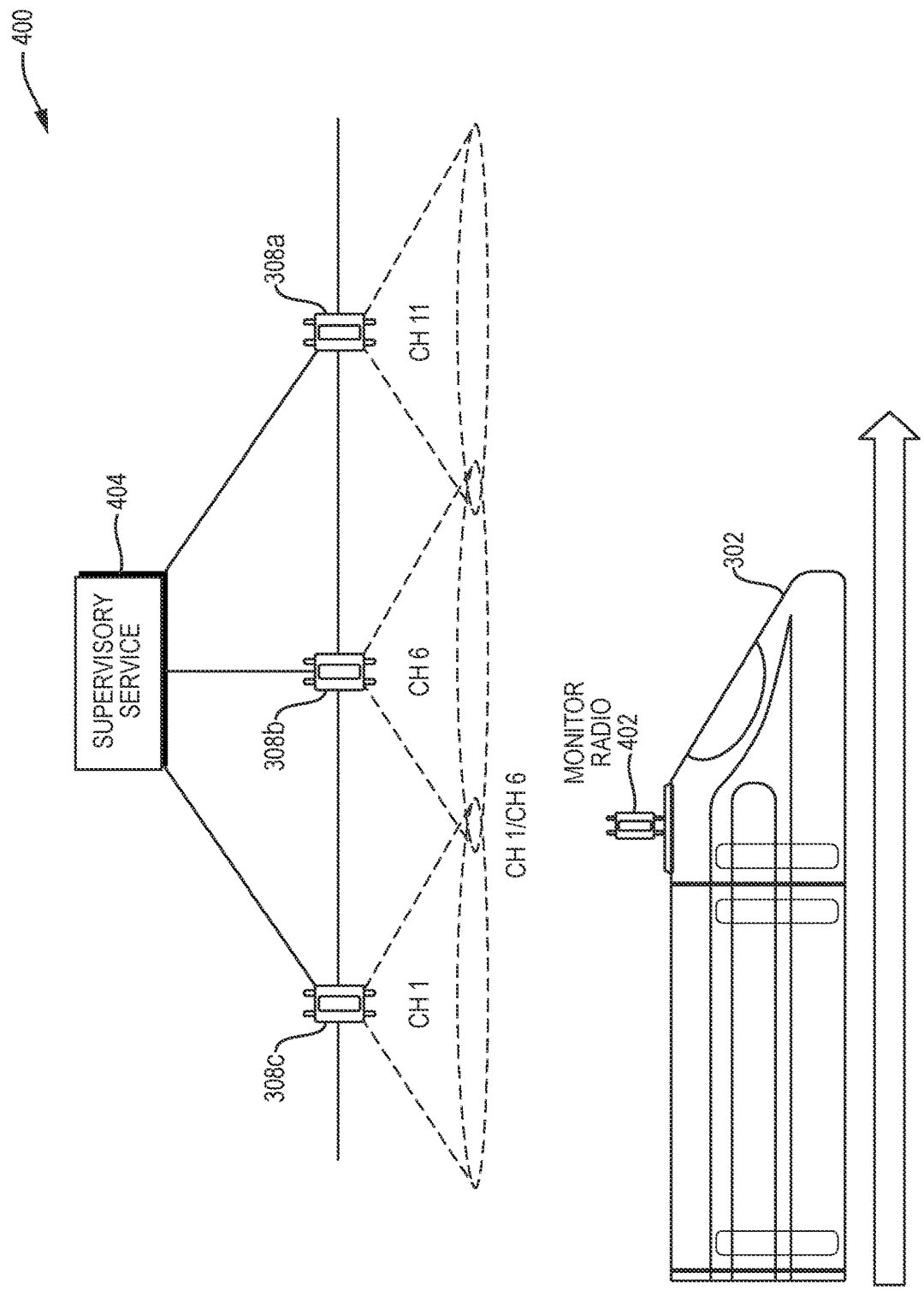
FIG. 4 illustrates an example of a mobile system using a dedicated monitor radio.

Operationally, FIG. 4 illustrates an example of mobile system 302 using a dedicated monitor radio, according to various embodiments. As shown, the techniques herein propose configuring the access points/base station of the infrastructure to use different wireless channels, to optimize throughput and reduce interference. For instance, assume that mobile system 302 is moving along a path of travel along which base station 308a, base station 308b, and base station 308c are located. Preferably, at any given time, each of base stations 308a-308c communicates on a different wireless channel than that of the others.

In some embodiments, base stations 308a-308c may be controlled by a supervisory service 404 executed by one or more devices in the network (e.g., GW 306, any or all of base stations 308a-308c, etc.). For instance, supervisory service 404 may take the form of the Radio Resource Management (RRM) service by Cisco Systems, Inc., or another service configured to control the operations of access points in a wireless network.

More specifically, supervisory service 404 may perform dynamic channel assignment (DCA) among base stations 308a-308c, in one embodiment. Generally, DCA is a mechanism that allows supervisory service 404 to group access points into radio frequency (RF) groups and uses telemetry collected among an RF group to control their channel plans, transmit power settings, throughput parameters, and the like. For instance, if base stations 308a and base station 308b are on adjacent wireless channels in the same band (e.g., channels 1 and 2 in the 802.11b/g band), their communications can still interfere with one another if they simultaneously use throughputs of 11 Mbps or 54 Mbps. Accordingly, supervisory service 404 may take these and other factors into account when configuring base stations 308a-308c.

In order not to waste time in channel scanning, radios have to know what wireless channel to use at any given time, as well as when to switch wireless channels. To facilitate this, the techniques herein propose outfitting a mobile system, such as mobile system 302, with one or more dedicated monitor radios, in various embodiments. For instance, mobile system 302 may be equipped with a monitor radio 402 that scans the spectrum and identifies the next upcoming access point/base station 308 and the channels that they use. In general, monitor radio 402 is considered 'dedicated' in that it does not participate in the backhaul task, itself.

As mobile system 302 continues to move in its direction of travel (e.g., along a train track, roadway, runway, etc.), assume now that monitor radio 402 is now within range of base station 308b. In such a case, monitor radio 402 may detect the channel in use by base station 308b, allowing mobile system 302 to initiate an eventual handoff to base station 308b.

Typically, monitor radio 402 may be located near a forward end of mobile system 302 pointing towards its direction of travel. However, one or more other dedicated monitor radios may also be located towards the rear of mobile system 302 and point away from its direction of travel.

To further ensure that monitor radio 402 is able to detect an upcoming access point, as opposed to detecting a prior access point (e.g., behind mobile system 302), monitor radio 402 may also include a directional antenna pointed substantially in the direction of travel of mobile system 302. For instance, monitor radio 402 may use a Yagi antenna, phased array antenna, or the like. In another embodiment, monitor radio 402 may also maintain an ordered list of service set identifiers (SSIDs) for the base stations 308, that it can use to determine whether a detected base station/access point is upcoming relative to the motion of mobile system 302.

Figure 5:
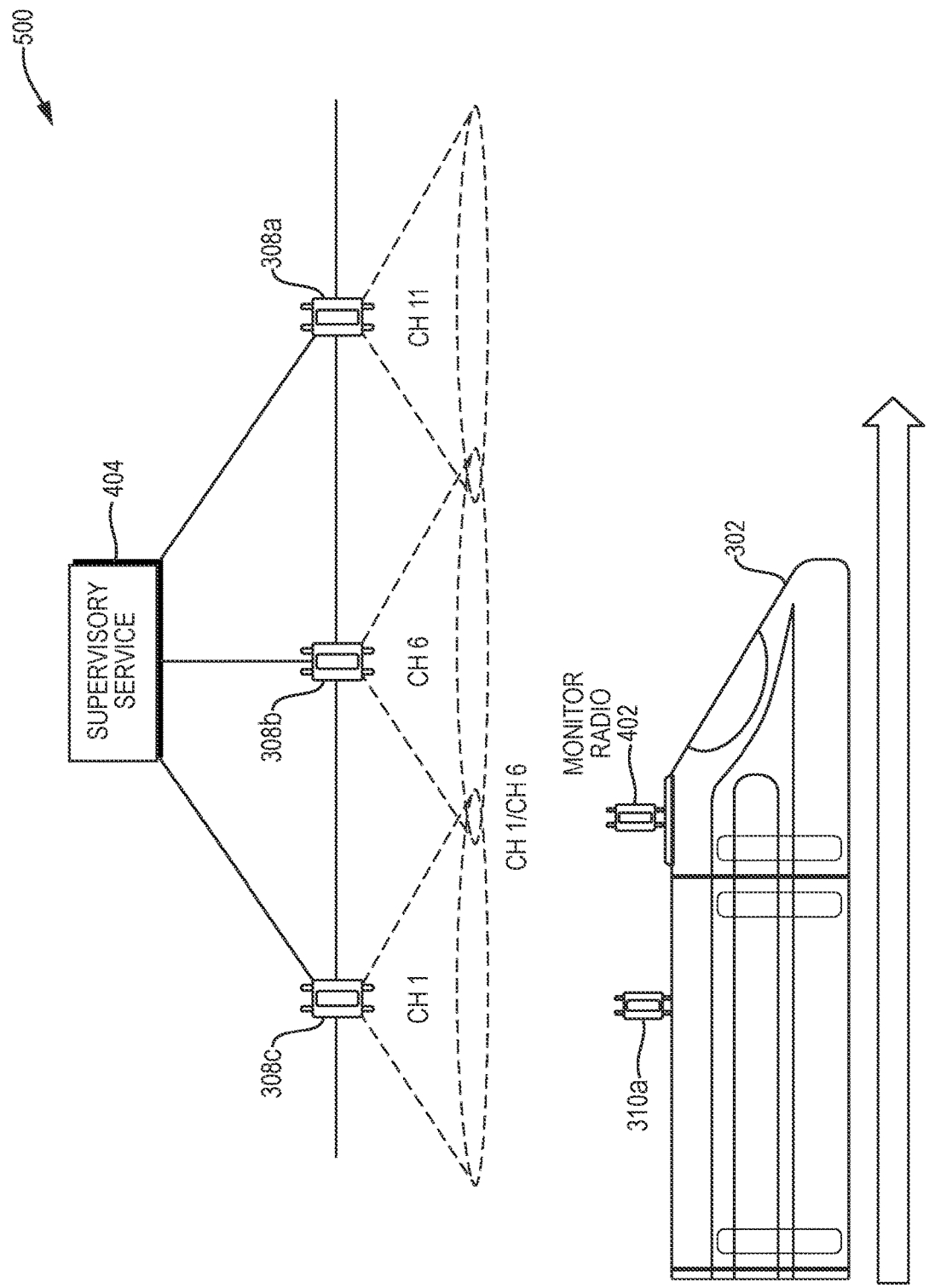
FIG. 5 illustrates an example of a mobile system initiating a wireless handoff.

FIG. 5 illustrates an example 500 of mobile system 302 initiating a wireless handoff, according to various embodiments. As shown, assume now that MN 310a is currently connected to base station 308c using channel 1 and that monitor radio 402 has detected base station 308b and its channel (e.g., channel 6) as upcoming. In such a case, monitor radio 402 may indicate the upcoming channel of base station 308b to MN 310a, to initiate a handoff. During such a handoff, MN 310a may switch to the new channel, channel 6, and establish a new connection with base station 308b.

In instances in which mobile system 302 includes multiple radios for backhauling, such as MN 310a-310b, it may also maintain a connection between MN 310b and base station 308c, until MN 310a has fully completed forming an association/connection with base station 308b.

In various embodiments, mobile system 302 may also provide the scanning results of monitor radio 402 to supervisory service 404. Doing so allows supervisory service 404 to better assess and configure the channel plans of base stations 308a-308c over the course of time. In one embodiment, such reporting can also be used to drive the handoff procedure for MN 310a, either during the handoff or asynchronously. For instance, base station 308c may report the channel for the upcoming base station 308b to 310a, prompting MN 310a to switch channels and connect to base station 308b.

In another embodiment, mobile system 302 may leverage machine learning to help optimize the scanning process employed by monitor radio 402. For instance, as mobile system 302 moves back and forth along the same physical path, mobile system 302 may learn which channels each base station 308 tends to use. Such learning could be used for purposes of simplifying the scanning process (e.g., by beginning a scan for the channel predicted to be in use, etc.).

Figure 6:
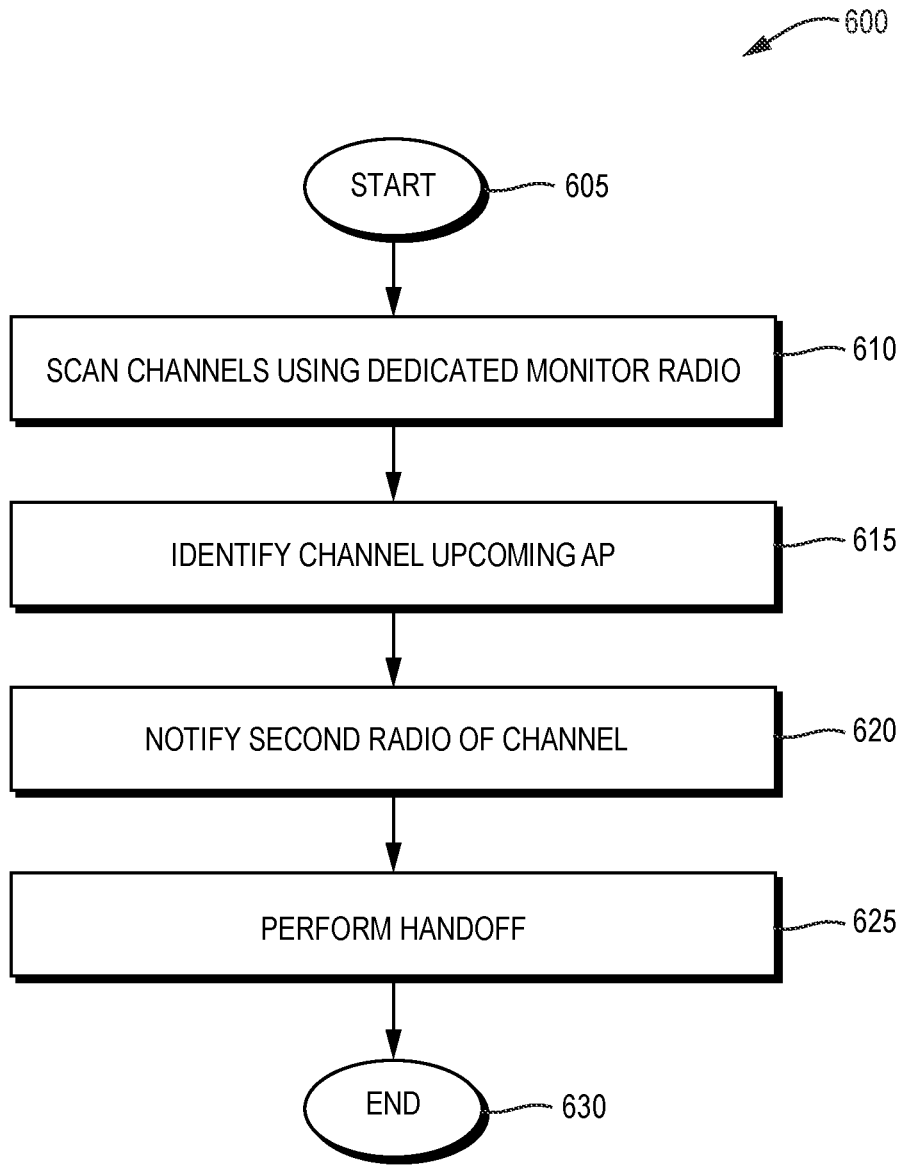
FIG. 6 illustrates an example simplified procedure for performing a handoff in a wireless network.

FIG. 6 illustrates an example simplified procedure (e.g., a method) for performing a handoff in a wireless network, in accordance with one or more embodiments described herein. For example, a non-generic, specifically configured device/apparatus (e.g., device 200), located on board a mobile system of a wireless network may perform procedure 600 by executing stored instructions (e.g., communication process 248 and/or routing process 244). Procedure 600 may start at step 605 and continues on to step 610 where, as described in greater detail above, the mobile system scans wireless channels for any upcoming access points using a dedicated monitor radio of the mobile system. In other words, the monitor radio may only be used by the mobile system for purposes of scanning wireless channels and identifying upcoming access points, rather than providing actual network connectivity to the mobile system. In some embodiments, the dedicated monitor radio may include a directional antenna pointed substantially in a direction of travel of the mobile system. In general, the mobile system may take the form of any moving system, such as a moving vehicle (e.g., a train, automobile, aircraft, etc.) or the like.

At step 615, as detailed above, the mobile system may identify a particular wireless channel in use by an upcoming access point. More specifically, based on the scanning performed by the dedicated monitor radio of the mobile system, the mobile system may detect a channel in use by an upcoming access point, which may be along the direction of travel of the mobile system (e.g., a train track, roadway, etc.). In some embodiments, the mobile system may also determine that the identified access point is upcoming in its direction of travel, based in part on an ordered set of SSIDs for the access points, so as to avoid inadvertently identifying an access point that the mobile system has already passed or another access point that is out of order along the direction of travel.

At step 620, the mobile system may notify a second radio of the mobile system of the particular wireless channel, as described in greater detail above. In some embodiments, the second radio may already be connected to a current access point of the wireless network, which may also be on a different channel than that of the upcoming access point. In some instances, the mobile system may also report the particular wireless channel to a supervisory service that controls the current access point and the upcoming access point. Such a service may, for instance, configure those access points with non-overlapping channel schedules. By making such a report to the supervisory service, the supervisory service may also configure the second radio of the mobile system to switch channels as part of a handoff, in one embodiment.

At step 625, as described in greater detail above, the mobile system may perform a handoff between a current access point and the upcoming access point in part by switching the second radio of the mobile system to the particular wireless channel of the upcoming access point. In one embodiment, the mobile system may also maintain a connection between a third radio of the mobile system and the current access point, until at least the second radio forms a connection with the upcoming access point. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for throughput and wireless channel interference mitigation for mobile systems, it is to be understood that various other adaptations and modifications may be made within the spirit and scope of the embodiments herein. For example, while certain embodiments are described herein with respect to using certain wired and/or wireless protocols, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
scanning, by a mobile system, wireless channels for any upcoming access points of a backhaul network using a dedicated monitor radio of the mobile system, wherein the dedicated monitor radio does not participate in backhauling on the backhaul network;
identifying, by the mobile system, a particular wireless channel in use by an upcoming access point;
notifying, by the mobile system, a second radio of the mobile system of the particular wireless channel; and
performing, by the mobile system, a handoff between a current access point and the upcoming access point in part by switching the second radio of the mobile system to the particular wireless channel of the upcoming access point for backhauling by the mobile system on the backhaul network.

2. The method as in claim 1, wherein the current access point and the upcoming access point are on different wireless channels.

3. The method as in claim 1, wherein the dedicated monitor radio comprises a directional antenna pointed substantially in a direction of travel of the mobile system.

4. The method as in claim 1, further comprising:
determining, by the mobile system, that the upcoming access point is in a direction of travel of the mobile system based in part on an ordered set of service set identifiers.

5. The method as in claim 1, further comprising:
training, by the mobile system and based in part on the particular wireless channel, a machine learning model to predict a channel on which the upcoming access point will be; and
using, by the mobile system, the machine learning model to control scanning of the wireless channels by the dedicated monitor radio.

6. The method as in claim 1, further comprising:
maintaining, by the mobile system, a connection between a third radio of the mobile system and the current access point, until at least the second radio forms a connection with the upcoming access point.

7. The method as in claim 1, further comprising:
reporting, by the mobile system, the particular wireless channel to a supervisory service that controls the current access point and the upcoming access point.

8. The method as in claim 7, wherein the supervisory service configures the current access point and the upcoming access point with non-overlapping channel schedules.

9. The method as in claim 7, wherein the supervisory service configures the second radio to switch to the particular wireless channel.

10. The method as in claim 1, wherein the mobile system comprises a moving vehicle.

11. An apparatus of a mobile system, comprising:
one or more network interfaces;
a processor coupled to the one or more network interfaces and configured to execute one or more processes; and a memory configured to store a process that is executable by the processor, the process when executed configured to:
- scan wireless channels for any upcoming access points of a backhaul network using a dedicated monitor radio of the mobile system, wherein the dedicated monitor radio does not participate in backhauling on the backhaul network;
- identify a particular wireless channel in use by an upcoming access point;
- notify a second radio of the mobile system of the particular wireless channel; and
- perform a handoff between a current access point and the upcoming access point in part by switching the second radio of the mobile system to the particular wireless channel of the upcoming access point for backhauling by the mobile system on the backhaul network.

12. The apparatus as in claim 11, wherein the current access point and the upcoming access point are on different wireless channels.

13. The apparatus as in claim 11, wherein the dedicated monitor radio comprises a directional antenna pointed substantially in a direction of travel of the mobile system.

14. The apparatus as in claim 11, wherein the process when executed is further configured to:
- determine that the upcoming access point is in a direction of travel of the mobile system based in part on an ordered set of service set identifiers.

15. The apparatus as in claim 11, wherein the process when executed is further configured to:
- train, based in part on the particular wireless channel, a machine learning model to predict a channel on which the upcoming access point will be; and
- use the machine learning model to control scanning of the wireless channels by the dedicated monitor radio.

16. The apparatus as in claim 11, wherein the process when executed is further configured to:
- maintain a connection between a third radio of the mobile system and the current access point, until at least the second radio forms a connection with the upcoming access point.

17. The apparatus as in claim 11, wherein the process when executed is further configured to:
- reporting, by the mobile system, the particular wireless channel to a supervisory service that controls the current access point and the upcoming access point.

18. The apparatus as in claim 17, wherein the supervisory service configures the current access point and the upcoming access point with non-overlapping channel schedules.

19. The apparatus as in claim 11, wherein the mobile system comprises a moving vehicle.

20. A tangible, non-transitory, computer-readable medium storing program instructions that cause a mobile system to execute a process comprising:
- scanning, by the mobile system, wireless channels for any upcoming access points of a backhaul network using a dedicated monitor radio of the mobile system, wherein the dedicated monitor radio does not participate in backhauling on the backhaul network;
- identifying, by the mobile system, a particular wireless channel in use by an upcoming access point;
- notifying, by the mobile system, a second radio of the mobile system of the particular wireless channel; and
- performing, by the mobile system, a handoff between a current access point and the upcoming access point in part by switching the second radio of the mobile system to the particular wireless channel of the upcoming access point for backhauling by the mobile system on the backhaul network.

* * * * *